United States Patent [19]
Chiang et al.

[11] Patent Number: 5,349,249
[45] Date of Patent: Sep. 20, 1994

[54] PROGRAMMABLE LOGIC DEVICE HAVING SECURITY ELEMENTS LOCATED AMONGST CONFIGURATION BIT LOCATION TO PREVENT UNAUTHORIZED READING

[75] Inventors: David Chiang, Saratoga; Thomas Y. Ho, Milpitas; Wei-Yi Ku, Cupertino; George H. Simmons, Sunnyvale; Robert W. Barker, San Jose, all of Calif.

[73] Assignee: Xilinx, Inc., San Jose, Calif.

[21] Appl. No.: 43,882

[22] Filed: Apr. 7, 1993

[51] Int. Cl.[5] .................. H04L 9/00; H03K 19/177
[52] U.S. Cl. ............................. 307/465; 380/4; 365/185; 340/825.83
[58] Field of Search .................. 307/465, 465.1; 340/825.83, 825.84, 825.85, 825.86, 825.87; 380/4; 365/96, 104, 185, 225.7

[56] References Cited
U.S. PATENT DOCUMENTS 4,698,617 10/1987 Bauer ........................ 380/4
5,099,516 3/1992 Durkin et al. ................ 380/4
5,175,840 12/1992 Sawase et al. ............... 365/201
5,191,608 3/1993 Geronimi .................... 380/4
5,224,166 6/1993 Hartman, Jr. ................ 380/4

Primary Examiner—Edward P. Westin
Assistant Examiner—Benjamin D. Driscoll
Attorney, Agent, or Firm—Edel M. Young; Norman R. Klivans

[57] ABSTRACT

More than one security bit is used in a block of a PLD chip. The internal configuration and other information is left unprotected when all the security bits are in the erased state, and is protected by programming one or all the security bits. The security bits are located physically in proximity to the areas containing configuration and any other user-defined data, both so that they are difficult to discover and so that the erasure of all security bits in a EPROM-based PLD would cause a large number of adjacent user-defined bits to be erased as well, hence making it very difficult to extract useful information from a protected device by reverse engineering. Situating security bits in a different, pseudorandom location within each block of the chip makes them difficult to find and so further inhibits reverse engineering.

14 Claims, 1 Drawing Sheet

PROGRAMMABLE LOGIC DEVICE HAVING SECURITY ELEMENTS LOCATED AMONGST CONFIGURATION BIT LOCATION TO PREVENT UNAUTHORIZED READING

BACKGROUND OF THE INVENTION

1. Field of the Invention

This invention relates generally to programmable logic devices (PLDs), and more particularly to security protection of internal configuration information of PLDs.

2. Description of the Prior Art

A PLD usually includes multiple configurable logic blocks, I/O blocks and an interconnect network. FIG. 1 shows one enlarged configurable logic block in a PLD device, including a programmable configuration element area A, where programmable configuration elements 11 are located in a row-column array, and an area B, where the AND array, and hence the AND programmable element array are located. A typical contains several such blocks. It is to be understood that the AND array B is only an example; area B can be any other programmable logic array. The programmable configuration elements in area A control multiplexers, gates, tri-state buffers, etc. to configure the block into different internal configurations, while the AND programmable elements in area B are for programming the AND array to specify different combinatorial logic functions. In addition, programmable elements are also included in the interconnect network to determine routing between the blocks. In most cases, all these programmable elements are identical for a given PLD. They la9 be fuses, anti-fuses, EPROM or EEPROM elements or other programmable memory elements.

Programing of a PLD is accomplished by programing each of the programmable elements. However, the most important information defining a user's chip design of the block is contained in the programmable configuration element array in area A because the programing of these elements 11 determines the basic circuit structure the block assumes. Normally the state pattern of these programmable elements programmed into a PLD can, like a PROM, be read and displayed by use of programming hardware to allow a user to verify his design. Therefore, if no security steps are taken, a user's design implemented by such programmed PLDs can easily be reverse-engineered (copied) since the state pattern of the programmable configuration elements programmed into a PLD determines the internal configuration, hence the operation, of the device. Therefore, a single security element configuration bit 12 as shown in FIG. 1 is often provided in PLDs, and disables this read function when bit 12 is in a set state. This somewhat secures the user's design from attempts to copy or reverse engineer it. However, no special consideration is given as to the location of bit 12, and it has even in some cases been physically isolated in some chips, making its location easily discovered. In any case, if a reverse engineer carefully examines the chip and sees what gates control the reading operation and what disables the reading operation, he may find the security bit 12 and restore it to its unset or original state, and then the internal configuration information can easily be read out again.

Erasable CMOS PLDs, commonly called EPLDs, are considerably more secure than the above described electrically programmable devices. EPLDs are fabricated by a technology similar to that of EPROMs, and have a quartz window in the chip package for UV-erasing programmed data, and are reprogrammable. As described above, EPROM-based PLDs have a "security bit" 12 in configuration area A as shown in FIG. 1, which, if set by the programmer, disables reading of the internal configuration information. For such a device, the security bit can be erased by exposure of the chip to ultraviolet light, although in such a case, all the configuration information in area A is erased as well, hence ensuring the security of the design. However, the security bit can sometimes be defeated by a diligent "reverse engineer" who carefully examines the chip and determines approximately where in the chip the single security bit is located, and can erase just the area immediately surrounding the security bit, while leaving much of the other EPROM region unerased. In this case, the bulk of the configuration information can still be read out, easing the task of reverse engineering.

SUMMARY OF THE INVENTION

Accordingly, one object of this invention is to improve design security in PLDs to prevent information entered by a user from being read out by unauthorized personnel, thus preventing the device from being reverse engineered.

Another object of this invention is to provide a method for design security in PLDs which makes security bits more difficult to be found by unauthorized personnel.

A further object with EPROM-based PLDs is for a large number of bits per block to be erased if someone attempts to reverse engineer a user's design.

According to the present invention, a plurality of programmable security elements is provided in a PLD, each element having first and second states. The plurality of programmable security elements enables configuration and other data to be read from the programmable logic device only when each of the plurality of programmable security elements is set to a given state; the plurality of programmable security elements disables reading of user-entered data when at least one of the programmable security element is not set to its given state. In one embodiment, all security elements are set to logical 1 after programing and must be reset to logical 0 before the configuration and other data can be read. In another embodiment, the security bits are set after configuration to carry a selected pattern of 0's and 1's and must all be set to the opposite states before configuration and other data can be read.

In accordance with one aspect of the invention, at least some of the plurality of programmable security bits are disposed physically in close proximity to areas containing configuration data.

In accordance with another aspect of the invention, the programmable security bits are each situated in a different, pseudorandom location within each configuration EPROM region to make it difficult to find them and to cause erasure of the configuration bits surrounding the bits when an attempt to erase the security bit is made.

The above and other objects, features and advantages of the present invention will be clear from the following detailed description in conjunction with the drawings.

DETAILED DESCRIPTION

Figure 1:
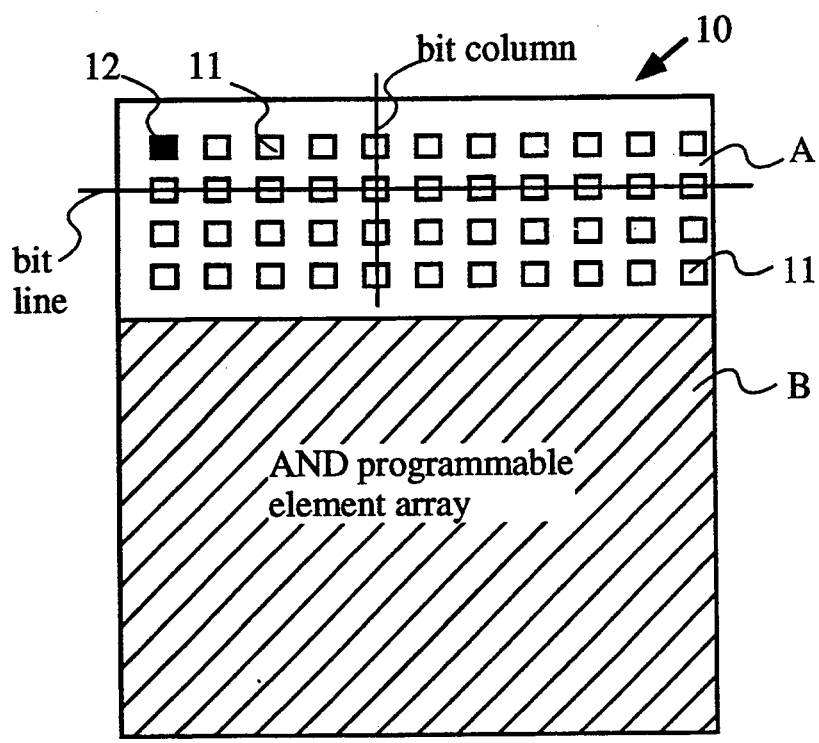
FIG. 1 is a schematic diagram showing in the prior art a single programmable security element located in a programmable configuration element array.
Figure 2:
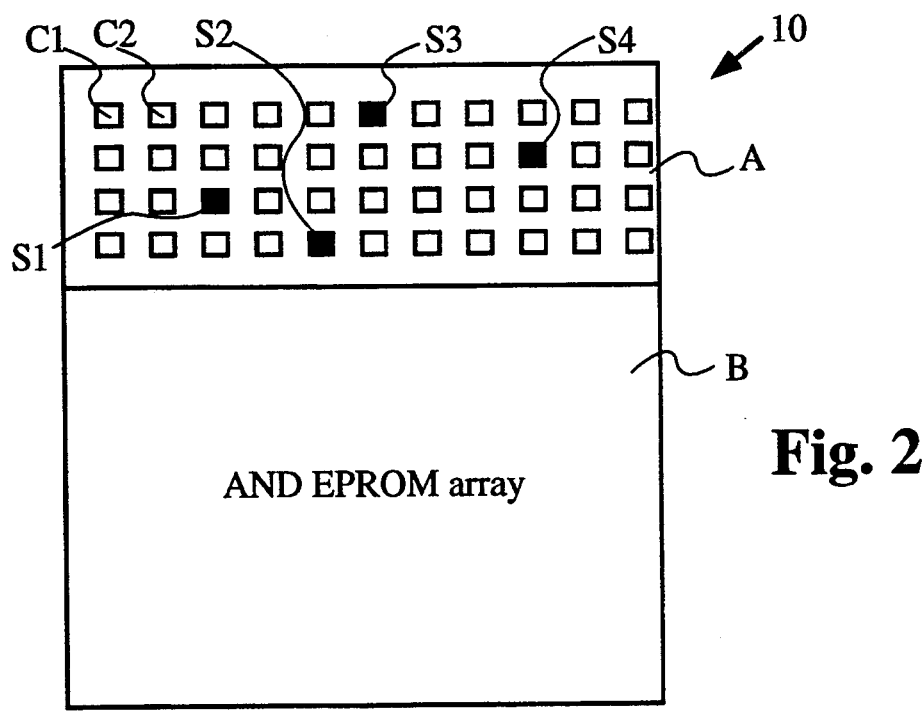
FIG. 2 is a schematic diagram showing an embodiment of the present invention, where multiple programmable security elements are distributed over the programmable configuration element array.

FIG. 2, similar to FIG. 1, shows an enlarged configurable logic block (one of several on a PLD) which includes a programmable configuration element array A and an AND gate programmable element array B. According to the present invention, a plurality of programmable security elements, for example S1, S2, S3 and S4 as shown in FIG. 2, are distributed among the array of programmable configuration elements (configuration bits) C1, C2, . . . The security elements S1, . . . , S4 are each set by the programmer after programming of the PLD, disabling the reading of the internal configuration information in the PLD block. The configuration information can be read from the PLD block only when each of the programmable security elements is located and restored to its original or unset state. Since these programmable security elements are usually identical in physical structure to the programmable elements C1, C2, . . . in the array A in which they are distributed, such distribution makes location of them difficult for a reverse-engineer. As mentioned above, the programmable elements may be fuses, anti-fuses, EPROM or EEPROM elements, or other programmable memory elements.

In the case of EPROM-based PLDs, the array A in FIG. 2 is the configuration EPROM array, and the array B is the AND EPROM array. Programming technology similar to that of conventional EPROMs is employed, and configuration data programmed into such a PLD can be UV-erased for reprogramming of the device. Floating gate avalanche injection MOS (FAMOS) transistors are used as programmable security bits, or alternatively other programmable elements may be used for the erasable part of the device. The set state of a FAMOS transistor is erased by discharging the floating gate of the transistor which was charged during its programming, by exposure to UV light for a period of time. However, it is difficult to guide the ultraviolet light to only a single FAMOS transistor, which occupies an extremely small area on a chip, without exposing the proximal area. This is because the reverse engineer can only estimate the approximate locations of the security bits after he examines the chip. Also, reverse engineers typically lack positioning equipment which generate a sharp enough beam to locate and focus light on a single transistor. In a typical case, erasing of a security bit by a reverse engineer will therefore simultaneously erase at least 8 to 20 surrounding configuration bits if it is disposed within the configuration EPROM array A. Consequently, when enough security bits are distributed over the array A, erasure of all these security bits also erases a substantial number of adjacent configuration bits, so that a reverse engineer or copier would not get any significant design information from the rest of the configuration data, causing the reverse engineering attempt to fail.

The manner in which multiple security bits disable the reading operation from the configuration EPROMS is similar to the prior art where a single security bit is used. Each security bit, like any other configuration bit, contains data which is loaded into a latch on the chip upon power up. The latch for the security bit in the prior art then controls the reading operation of the configuration EPROM cells through logic gates. When multiple security bits are used, the outputs of corresponding security latches are logically ORed before controlling the reading operation through the gates. Therefore only when all the multiple security bits are in the unset state, is the reading operation enabled. As mentioned earlier, other embodiments use other patterns, and reading of these other embodiments is enabled with corresponding logic gates. For example, an embodiment which required four security bits to carry the pattern 0101 would use an OR gate with two inverted inputs, and enable reading when the output was low.

The locations of the security bits may differ from one model to another. The locations of the security bits are fixed when a chip is fabricated, and the information as to the locations is supplied in separate documents to the user. Even if these documents fall into a reverse engineer's hands, he still will not be able to obtain any significant design information because of the erasing of a substantial number of configuration bits when he tries to erase the security bits.

The number of security bits used depends on the size of the configuration array block to be protected. As an example, if the configuration array has 9 bit lines and 48 bit columns, then 4 security bits are adequate because to erase 4 security bits will erase 32 to 80 of the 432 configuration bits, causing significant loss of configuration information. In one embodiment using a larger array, 40 security bits are distributed through the array.

Furthermore, each of the plurality of security bits is in one embodiment situated in a different, pseudorandom location within each EPROM block so that they are difficult to locate.

with the scheme described above, the configuration data may be left unprotected by simply leaving all the security bits in the unset or erased state. The configuration may be protected by programming any or all the security bits. In order to read a protected device, all the set security bits must be found and erased. Since it is very difficult to erase an individual EPROM bit using ultraviolet light without erasing some of its neighbors, erasure of each set security bits causes many adjoining configuration bits to be erased as well, hence making it very difficult to extract useful information from a protected device.

Though the above description relates to configuration information, in another embodiment, a user enters both configuration information and other data specific to the design. The security bits also protect this other information because they are embedded in the area where the configuration and other information are stored.

A legitimate user has no need to unset the security bits since if the legitimate user wants to read back the configuration data he simply does not set the security bits (or in another embodiment sets them to the pattern which will allow readback). Such a mode is used for testing. Of course the legitimate user also has access to the configuration data before it is loaded into the device.

This disclosure is illustrative and not limiting; further modifications and variations will be apparent to those skilled in the art in light of this disclosure and the appended claims. For example, the security bits can also be scattered among the programmable elements in the interconnect network or even in the AND EPROM array B; the scheme is also suitable using any light-erasable programmable element as security bit. The scope of the invention is limited only by the claims which follow.

What we claim is:

1. A method for improving design security in a programmable logic device on an integrated circuit die, comprising:

providing on the integrated circuit die an array of programmable configuration elements;

providing on the integrated circuit die a plurality of programmable security elements, each having a state which allows readback and a state which does not allow readback, and wherein each programmable security element is distributed among programmable configured elements of said array;

connecting said plurality of programmable security elements to the integrated circuit, wherein said plurality of programmable security elements enables data to be read out from the programmable logic device only when each of said plurality of programmable security elements is set to its state which allows readback; and said plurality of programmable security elements disables the reading of data when at least one of said programmable security elements is set to its state which does not allow readback; and setting at least one of said programmable security elements to its state which does not allow readback.

2. The method of claim 1, wherein each programmable security element is randomly distributed among said programmable configuration elements of said array.

3. A method as in claim 1, wherein said programmable security elements are disposed at irregular locations in the programmable logic device.

4. A method as in claim 1, wherein the programmable security elements and programmable configuration elements are structurally identical.

5. A method as in claim 4, wherein said same programmable security elements are light-erasable programmable elements.

6. A method as in claim 5, wherein the light is ultraviolet light.

7. A method for improving design security in a programmable logic device on an integrated circuit die, comprising:

providing on the integrated circuit die a plurality of programmable security elements, each having a state which allows readback and a state which does not allow readback;

disposing each of the programmable security elements in proximity to areas containing data for the programmable logic device on the integrated circuit die at irregular locations in the programmable logic device;

connecting said plurality of programmable security elements to the integrated circuit, wherein said plurality of programmable security elements enables said data to be read out from the programmable logic device only when each of said plurality of programmable security elements is set to its state which allows readback; and said plurality of programmable security elements disables the reading of said data when at least one of said programmable security elements is set to its state which does not allow readback; and setting at least one of said programmable security elements to its state which does not allow readback.

8. A programmable logic device comprising:

an array of programmable configuration elements;

a plurality of programmable security elements, each having a first state and a second state, each programmable security element being distributed among elements of said array of programmable configuration elements;

said plurality of programmable security elements enabling data to be read from the programmable logic device only when each of said plurality of programmable security elements is et to the first state; and said plurality of programmable security elements disabling the reading of data when at least one of said programmable security elements is set to the second state.

9. The device of claim 8, wherein each programmable security element is randomly distributed among said array of programmable configuration elements.

10. A device as in claim 8, wherein said plurality of programmable security elements are distributed across said array in an irregular pattern.

11. A device as in claim 8, wherein the programmable security elements and the programmable configuration elements are light-erasable elements.

12. An EPROM-based programmable logic device comprising:

at least one EPROM array for storing user-defined data;

a plurality of programmable security bits distributed among programmable elements of said EPROM array;

said plurality of programmable security bits enabling data to be read from the EPROM array when each of the plurality of programmable security bits is set to one of its binary values; and said plurality of programmable security bits disabling the reading of configuration data when at least one of said programmable security bits is set to the other of its binary values.

13. An EPROM-based programmable logic device as in claim 12, wherein said programmable security bits are distributed among said programmable elements in an irregular manner.

14. A programmable logic device comprising:

a plurality of programmable security elements, each having a first state and a second state;

an array of programmable configuration elements, wherein said plurality of programmable security elements are distributed in an irregular pattern on said array;

said plurality of programmable security elements enabling data to be read from the programmable logic device only when each of said plurality of programmable security elements is set to the first state; and said plurality of programmable security elements disabling the reading of data when at least one of said programmable security elements is set to oZ

* * * * *

UNITED STATES PATENT AND TRADEMARK OFFICE
CERTIFICATE OF CORRECTION

PATENT NO.  : 5,349,249

DATED       : September 20, 1994

INVENTOR(S) : David Chiang, Thomas Y. Ho, Wei-Yi Ku, George H. Simmons, and Robert W. Barker It is certified that error appears in the above-identified patent and that said Letters Patent is hereby corrected as shown below:

In the Title on the cover sheet "Location" should read --Locations--.

In the Title, col. 1, line 4, "Location" should read --Locations--.

Col. 1, line 21, "typical con-" should read --typical PLD con- --.

Col. 1, line 34, "la9" should read --may--.

Col. 4, line 40, "with" should read --With--.

Claim 8, col. 6, line 18, "et" should read --set--.

Claim 14, col. 6, line 66, "oZ" should read --the second state.--.

Signed and Sealed this

Third Day of October, 1995

BRUCE LEHMAN

*Attest:*

*Attesting Officer*    *Commissioner of Patents and Trademarks*